US011777783B2

(12) United States Patent
Meirosu et al.

(10) Patent No.: US 11,777,783 B2
(45) Date of Patent: Oct. 3, 2023

(54) NETWORK SLICING WITH SMART CONTRACTS

(71) Applicant: Telefonaktiebolaget LM Ericsson (publ), Stockholm (SE)

(72) Inventors: Catalin Meirosu, Solna (SE); Craig Schoneberg, Vaudreuil-Dorion (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 287 days.

(21) Appl. No.: 16/971,544

(22) PCT Filed: Feb. 26, 2018

(86) PCT No.: PCT/EP2018/054716
§ 371 (c)(1),
(2) Date: Aug. 20, 2020

(87) PCT Pub. No.: WO2019/161936
PCT Pub. Date: Aug. 29, 2019

(65) Prior Publication Data
US 2021/0091994 A1 Mar. 25, 2021

(51) Int. Cl.
*H04L 41/042* (2022.01)
*G06F 16/182* (2019.01)
(Continued)

(52) U.S. Cl.
CPC ........ *H04L 41/042* (2013.01); *G06F 16/1824* (2019.01); *G06Q 20/047* (2020.05);
(Continued)

(58) Field of Classification Search
CPC .. H04L 41/042; H04L 41/5006; H04M 15/66; H04M 15/8038; H04W 4/24; G06F 16/1824; G06Q 20/047
See application file for complete search history.

(56) References Cited

U.S. PATENT DOCUMENTS

| 10,348,488 B1* | 7/2019 | Paczkowski .......... H04L 9/0643 |
| 2020/0242603 A1* | 7/2020 | Salkintzis ............ G06Q 20/401 |
| 2021/0037013 A1* | 2/2021 | Salkintzis ........ G06Q 20/38215 |

FOREIGN PATENT DOCUMENTS

WO 2009128874 A1 10/2009

OTHER PUBLICATIONS

Backman, Jere et al, "Blockchain Network Slice Brokerin 5G, Slice Leasing in Factory of the Future Use Case,"2017, IEEE, pp. 1-8. (Year: 2017).*

(Continued)

*Primary Examiner* — Azizul Choudhury
(74) *Attorney, Agent, or Firm* — Christopher & Weisberg, P.A.

(57) ABSTRACT

A device to implement a method of managing user equipment resource tracking in a visited network using blockchain based smart contracts. The method is implemented by the device in a home network of the user equipment. The method includes receiving notification from the visited network of the user equipment connection request, installing a smart contract for the user equipment into a blockchain, and reporting an identifier for the smart contract to the visited network to enable recording of resource usage of the user equipment to the blockchain and association with the smart contract.

14 Claims, 10 Drawing Sheets

(51) Int. Cl.
*G06Q 20/04* (2012.01)
*H04L 41/5006* (2022.01)
*H04M 15/00* (2006.01)
*H04W 4/24* (2018.01)

(52) U.S. Cl.
CPC ........ *H04L 41/5006* (2013.01); *H04M 15/66* (2013.01); *H04M 15/8038* (2013.01); *H04W 4/24* (2013.01)

(56) References Cited

OTHER PUBLICATIONS

International Search Report dated Oct. 24, 2018 for International Application PCT/EP2018/054716 filed on Feb. 26, 2018, consisting of 11-pages.
Backman Jere et al; Blockchain Network Slice Broker in 5G: Slice leasing in factory of the future use case; Internet of Things Businee Models, Users, and Networks; Nov. 23, 2017, pp. 1-8; consisting of 11-pages.

* cited by examiner

NETWORK SLICING WITH SMART CONTRACTS

CROSS-REFERENCE TO RELATED APPLICATIONS

This application is a Submission Under 35 U.S.C. § 371 for U.S. National Stage Patent Application of International Application Number: PCT/EP2018/054716, filed Feb. 26, 2018 entitled "NETWORK SLICING WITH SMART CONTRACTS," the entirety of which is incorporated herein by reference.

TECHNICAL FIELD

Embodiments of the invention relate to the field of subscription agreement management; and more specifically, to the management of subscription agreements between communication networks using smart contracts.

BACKGROUND

In wireless communication networks, there is a need for wireless communication devices such as mobile phones to be able to communicate wirelessly even when these devices are outside their 'home' communication network. An operator or service provider administer communication networks. These operators provide access to their communication networks based on a subscription agreement with users of the communication network. The user with a subscription agreement can access wireless communication network of the operator using a device on terms governed by the subscription agreement. This communication network where a user has a subscription agreement is the 'home' communication network for that user. However, these communication networks have geographical limitations. Thus, when a user takes their device to a location that is not serviced by the home communication network, the user may seek to access a local communication network.

Roaming agreements have been created between different wireless communication networks to allow a user of a wireless communication device to roam into a visited network to which the user of the wireless communication device does not have a subscription. In this way, the user can get at least some of the services of the visited wireless communication network without having a separate subscription agreement with the operator of the visited wireless communication network. The $3^{rd}$ Generation Partnership Project (3GPP) defines some mechanisms to enable a user to roam in a visited network in 3GPP technical specification (TS) 23.401, shared network solutions such as 3GPP TS23.251, and similar mechanisms. Other solutions include the use of Gateway Core Network (GWCN) or Multi-Operator Core Network (MOCN) technologies.

These technologies require dedicated business agreements between the operators that can take a substantial amount of time to establish and implement. Changing the terms of these agreements is similarly difficult. These business agreements determine the terms of the services shared between the networks and can be highly complex and technical. These business agreements can address issues of payments for hardware related to the communication networks, licensing, software, protocols, charging schemes and numerous other factors.

A blockchain is a continuously growing list of records, called blocks, which are linked data structures. The blocks are protected using cryptographic technologies. Each block in a blockchain includes a link to a previous block in the blockchain. The blockchain is designed to be inherently resistant to improper manipulation of the data associated with each block. The blockchain operates as a sort of distributed ledger that is handled by distributed computing. The blockchain is maintained by participating nodes in a network, where each node implements a shared protocol for creating and validating new blocks to be added to the blockchain. Once added to the blockchain, the data in a given block cannot be changed without also changing all subsequently added blocks, which would require the majority of the participating nodes to coordinate. Blockchains have been utilized for the recording of events, medical records, transactions, and other record management applications.

SUMMARY

The embodiments include a method of managing user equipment resource tracking in a visited network using blockchain based smart contracts. The method can be implemented by a device in a home network of the user equipment and stored as a set of instruction on a non-transitory computer-readable medium. The method includes receiving notification from the visited network of the user equipment connection request, installing a smart contract for the user equipment into a blockchain, and reporting an identifier for the smart contract to the visited network to enable recording of resource usage of the user equipment to the blockchain and association with the smart contract.

The embodiments further include a method of managing user equipment resource tracking in a visited network using blockchain based smart contracts. The method implemented by a device in a visited network or stored as a set of instructions on a non-transitory computer-readable medium. The method includes receiving a connection request from the user equipment, notifying a home network for the user equipment of the connection request, and instantiating a charging proxy in the visited network for the user equipment to track resource usage of the user equipment in the visited network using a smart contract and blockchain to report resource usage for the user equipment.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
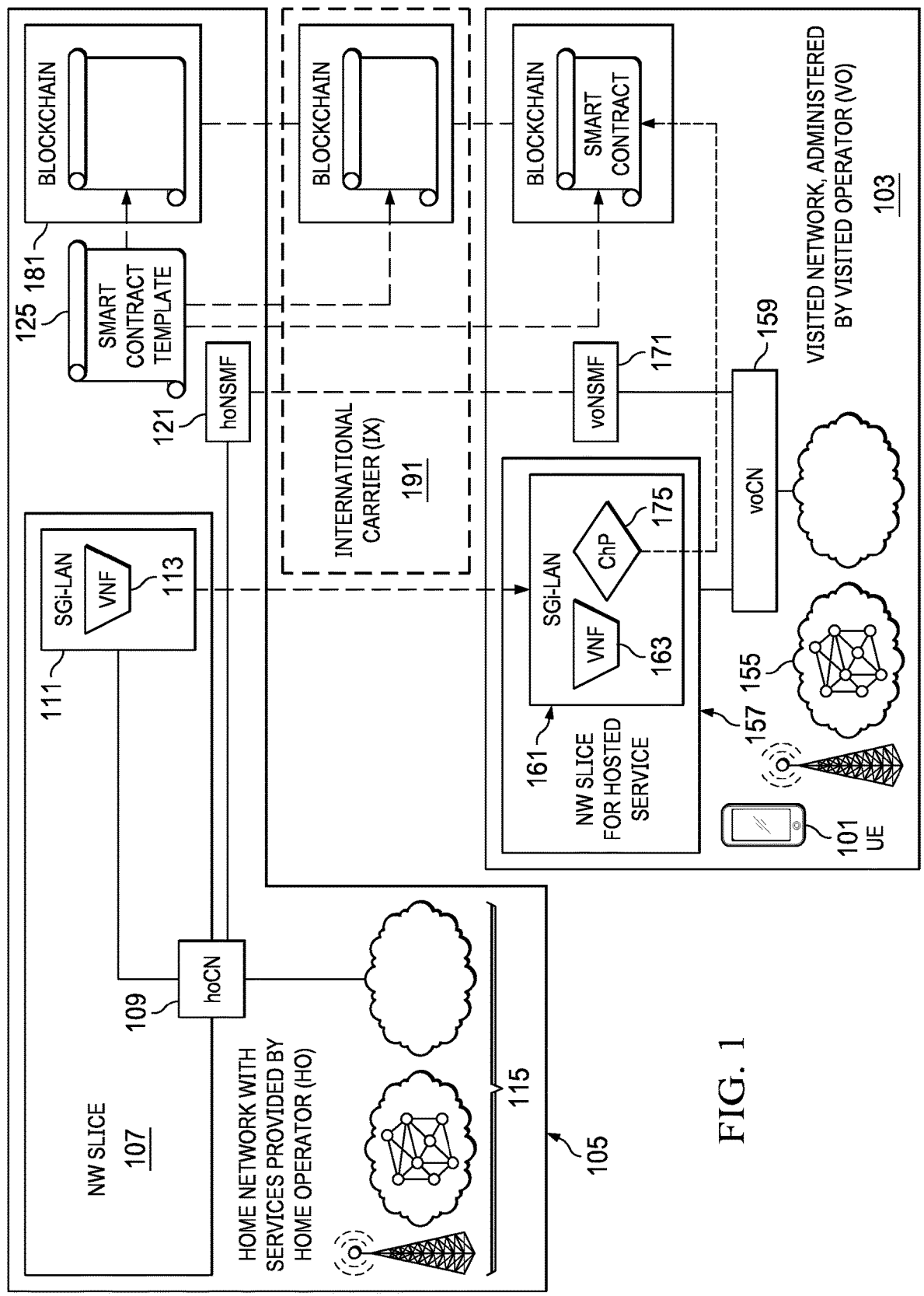
FIG. 1 is a diagram of one embodiment of a home and visited network including components supporting the smart contracts.

The following description describes methods and apparatus for the use of smart contracts to manage the negotiation of services in visited networks that are offered to user devices. In particular, the smart contracts are managed using a blockchain, such that a home network for a roaming user device generates and installs the smart contract of the associated user in the blockchain. The home network can also migrate services in the form of virtual network functions to the visited network. The visited network can record usage and similar charge activities to the smart contract in the block chain. When the user device returns to the home network, the services can migrate back with the user device and the smart contract can be terminated in the blockchain.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Definitions

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Overview

Roaming agreements are difficult to negotiate and their implementation requires significant efforts from both the operator of the home communication network and the operator of the visited wireless communication network. In addition, these roaming agreements usually cover only the standards-defined base functionality for the system. For example, the use of the Service Gateway—Internet Local Area Network (SGi-LAN) functionality is covered in some roaming agreements with limitations or not at all addressed by the roaming agreements currently, because SGi-LAN deployments are not standardized between the operators. Thus, the functions offered in the SGi-LAN of the home network to a subscriber may not exist or be supported in the SGi-LAN of the visited network.

In some embodiments, functions and services are offered in a visited network by use of a federated cloud slice, but this technology does not address charging aspects of the use of these resources. The use of federated cloud slices involves the instantiation of virtual network functions (VNFs) or similar virtualization system to provide services to a user by a home network that are then migrated and hosted in the visited network. The use of federated cloud slice technology is resource intensive with respect to the management interactions required for instantiating VNFs in the visited network. The operator of the visited network establishes the connection for sending raw VNF images, and calls for the configuration of the new VNF instance to be executed the visited network. This may mean that the visited network needs to have exactly the same management systems capabilities as the home network for managing these functions, which would be unlikely given the current situation of SGi-LAN deployments.

The embodiments overcome these limitations of the prior art by providing a method and system that upon receiving a service request from a user device located in a visited network, instantiates a customer-specific smart contract in a blockchain infrastructure shared between the visited and the home network. The method and system then trigger migrating state information associated with the services provided by the home network according to a subscription agreement with the user. The services are implemented as virtual network function (VNF) instances in the infrastructure of the home network. The home network coordinates with the visited network, consistent with the smart contract, to migrate these services as VNF instances to the visited network infrastructure. The embodiments thereby enable significant simplification with respect to both provisioning and charging for services and resources utilized in visited networks using federated network slices in both 4G and 5G networks. 4G networks are wireless communication networks that support the $4^{th}$ generation of broadband cellular technology, succeeding the 3G technology standards. The International Telecommunications Union-Radio communications sector (ITU-R) has specified a set of requirements for 4G named the International Mobile Telecommunications Advanced (IMT-Advanced) specification. 5G networks are $5^{th}$ generation mobile networks, also referred to as $5^{th}$ generation wireless systems that are a set of technology standards that are proposed to update or replace 4G technologies and that aim to provide a higher capacity in terms of number of devices supported and the bandwidth provided to those devices. The embodiments also simplify operations of the home and visited network by first instantiating the services for a user in a VNF that is executed in a well-known environment of the home network and then migrating a running instance of the services (e.g., by migrating the associated VNF instances) to the visited network infrastructure.

FIG. 1 is a diagram of one embodiment of a home and visited network including components supporting the smart contracts. In the example of FIG. 1, a user device, referred to as user equipment 101 (UE) is attempting to connect to a visited network 103 administered by a visited operator (VO). A home network 105 is administered by a home operator (HO). When the UE 101 is connected to the home network 105, it is said to be in the HO domain. When the UE 101 is connected to the visited network 103, it is said to be located in the VO domain. When the UE 101 requests to connect to the visited network 103, the UE 101 can also request to have the same services in VO domain as it has in the HO domain.

If the UE 101 is connected to the home network 105, the services provided in the HO domain can be implemented using network slicing. A network slice is a set of resources that support services that are implemented virtualized functions (e.g., virtual network functions (VNFs)) in a network function virtualization (NFV) infrastructure. Thus, the home operator can allocate resources of the home network 105 as a network slice 107 including a home operator core network (hoCN) 109 and SGi-LAN 111 that support at least one service as a VNF 113. When in the home network 105 a UE 101 can connect to the hoCN via a radio access network (RAN) 115. A home Core Network 109, is a 3GPP Core Network deployed in a mobile operator that is home to the UE 101. The hoCN 109 includes many components, which are not illustrated for sake of clarity and conciseness.

The SGi-LAN is a network of devices in the home network that provide services for the user equipment 101 when connected to the home network. SGi-LAN components can be utilized to perform service chain functions, policy and charging functions and similar functions for the home network 105. In some cases, these functions are implemented as VNFs 113. The VNFs 113 can be instances that are specific to a UE 101. The VNFs 113 and aspects of the SGi-LAN and hoCN 109 can form part of the network slice 109 servicing a UE 101 when connected to the home network 101.

The home network 101 can also include a home operator Network Slicing Management Function (hoNSMF) 121, represents a NSMF (e.g., as defined by 3GPP 28.801)

function deployed in the home operator. NSMF consists of three layers, a service instance layer, a network slice instance layer, and a resource layer. The service instance layer is managed by a service orchestrator that can be a part of a business support system/operations support system in the home network 105. The network slicing instance layer is a business to business service. The resource layer is the resource management component that determines the hardware component resource devoted to the network slices.

The visited network 103 is similarly configured, but not identical in its capabilities with the home network. The UE 101 in this example is currently connected or attempting to connect to the visited network 103. The visited network includes a RAN 155 through which the UE 101 communicates with a visited operator core network (voCN) 159. The voCN is a 3GPP Core Network deployed in a mobile operator (i.e., the visited operator). The visited network 103 also includes a SGi-LAN 161 that can support VNFs 163. The SGi-LAN 161 can also include a charging proxy 175 (e.g., as a VNF in the SGi-LAN 161). The charging proxy 175 is a function that manages the accounting for resource usage. The charging proxy 175 can track resource usage of the UE 101 in the visited network 103 and provide this information to the home network 105 to enable the operator of the home network 105 to charge the user of the UE 101 in accordance with a service agreement between the user and the home operator. Recourse tracking can encompass, radio spectrum usage, execution environment compute and storage usage and network resource usage. Radio spectrum usage include data, voice or short message service (SMS)/ multimedia messaging service (MMS). Execution environment resource tracking can include 'cloud' or similar distributed execution environment compute and storage resources. Network resource usage, of which radio spectrum is one type can include resources such as number of flow descriptors deployed in a router table or intrusion detection system, number of users or devices simultaneously attached to a slice, and similar resource tracking. The resource tracking can be specific to a UE, user or the VNFs for a user. For example, the charging proxy can track usage data related to the central processing unit (CPU) or similar resource usage of the VNFs 163 deployed in the SGi-LAN 161 for the UE 101, the number of rules deployed in a Firewall VNF that was instantiated as part of the roaming slice of the UE 101, the filtering activity of an Intrusion Detection System VNF that was instantiated as part of the roaming slice of that customer, and similar usage data.

The visited network 103 can also include a visited operator NSMF (voNSMF) 171 that manages network slicing activity in the visited network 103. The visited network 103 can support network slicing for UEs 101 such that they have access to services similar to that provided in the home network 105 while in the visited network 103. The visited network 103 can also support visiting UEs 101 with network slicing, referred to as 'roaming slices.' The visited network 103 and home network 105 can negotiate to enable the UE 101 to utilize a roaming slice 157 that is the same or similar to the network slice 107 the UE 101 would have had in the home network 105. The home network operator and the visited network operator will have previously negotiated a slice roaming contract and developed a smart contract template 125 that describes this relationship in both technical and business-related terms. Based on the pre-defined smart contract template 125, the voNSMF 171 can generate a set of VNFs for the UE 101 that is preconfigured for the specific conditions of the roaming slice required for attaching the UE 101 in the visited network 103.

A smart contract is a computer protocol that can digitally facilitate, verify, or enforce the negotiation or performance of a contract. Smart contracts can be implemented without the involvement of third parties. The smart contracts enable transactions that are trackable, but not reversible. Smart contracts can be implemented using blockchain technologies. Some existing blockchain technologies support varying types of smart contracts. Smart contracts, like blockchains generally, rely on byzantine fault tolerant algorithms and may utilize programming language features built into some block chain technologies to allow the definition of the terms of the smart contract with varying levels of custom logic. The blockchain based smart contracts are visible to users of the blockchain. The smart contract template 125 can be a basic format or set of functionalities that is supported for smart contracts utilized between a visitor network 103 and a home network 105, thus, ensuring that the components of each network can interpret the smart contract even if both networks do not otherwise have the same resources and capabilities for supporting UEs.

When a UE 101 connects to a visited network 103, the visited network 103 signals the home network 105, which causes the home network to generate a smart contract using a smart contract template 125 that is agreed upon between the two operators. The home network 105 then places the smart contract into the blockchain, which is managed a distributed system. The smart contract becomes a block 181 in the blockchain, that can be accessed by the visited network 103. The visited network 103 can access the block 181, but cannot modify it. The visited network 103 can thereby verify the services that the home network 105 offers the user of the UE 101 and can attempt to provide the same services in the visited network 103. In some embodiments, the home network 105 will provide an image of the VNFs that service the UE 101, which can then be instantiated in the roaming slice 157 to be utilized by the UE 101 as though it were operating in the home network 105.

In some embodiments, an international carrier (IX) 191 is a component in the system, for the case when some of the traffic generated by the UE 101 or for signaling purposes associated with the roaming slice 157 needs to transit through a third-party administrative domain that is different from the home network 105 and visited network 103. In this case, the international carrier 191 can access the smart contract associated with the user of the UE 101 to determine the terms of servicing these transmissions or signaling.

Figure 2A:
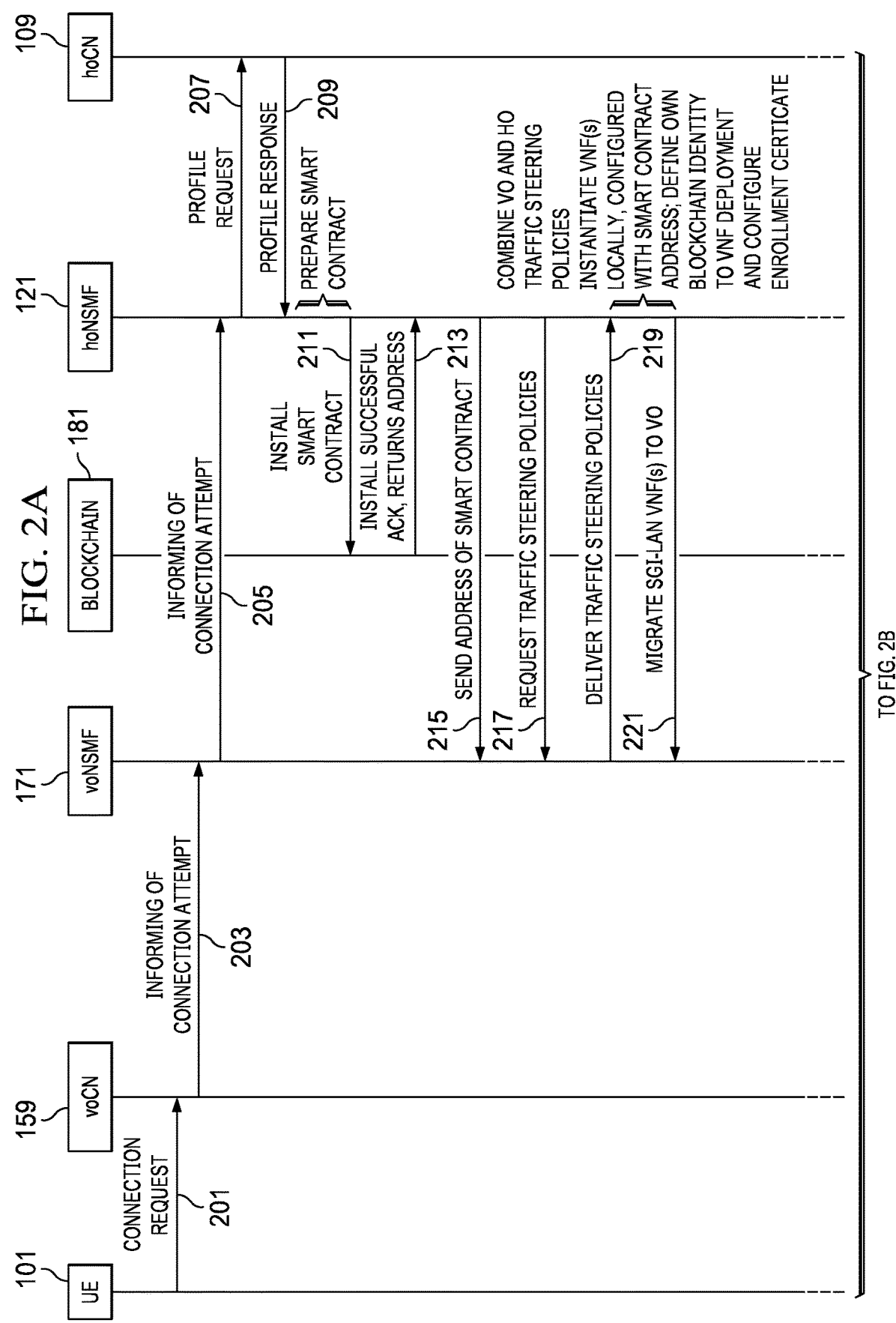
FIGS. 2A and 2B are a timing diagram of the interactions between components of the visited network, home network and blockchain.
Figure 2B:
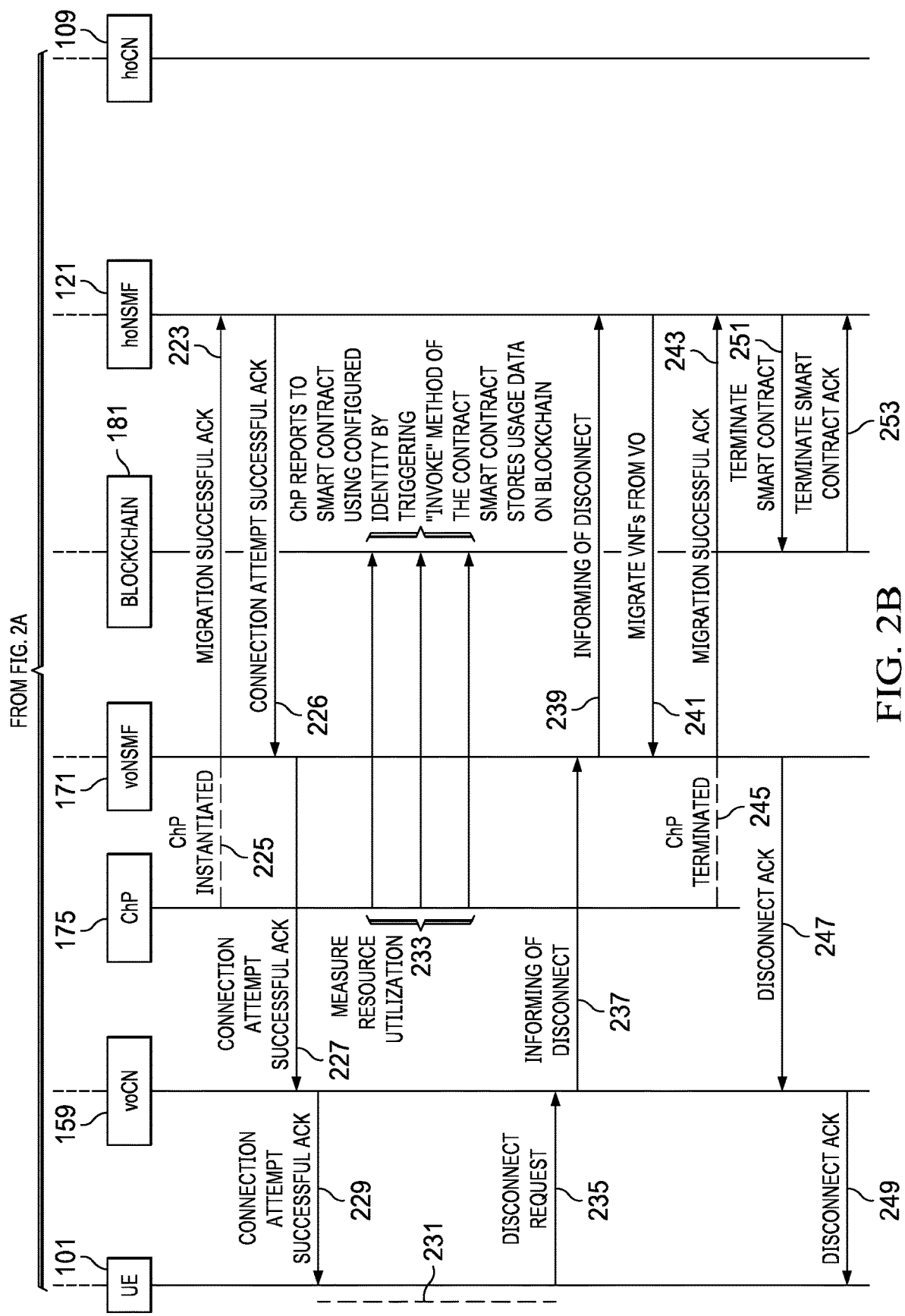

FIGS. 2A and 2B are a timing diagram of the interactions between UE 101, components of the visited network 103, home network 105 and blockchain 181. The illustrated timing diagram details the interactions that are involved to enable the connection of the UE 101 in a visited network 103, such as the example visited network scenario illustrated in FIG. 1. The process is initiated by the UE 101 sending a connection request 201 to the voCN 159. The UE 101 may connect via a RAN associated with the visited network 103 which relays the connection request to the voCN 159. The UE 101 sends a connection message using a standard 3GPP interface. This message transits a number of 3GPP-defined functional blocks in the RAN and other parts of the visited network 103 to reach the voCN 159.

The voCN 159 notifies 203 the voNSMF 171 of a connection attempt. The UE 101 may provide identification information such as a media access control (MAC) address or similar identifier to enable the UE 101 to be associated with a home network 105, user and/or service agreement. In some embodiments, the UE 101 provides information to identify a home network 105, user, smart contract identification or similar information to facilitate the connection of the UE 101 in the visited network 103. Similarly, the voCN 159 may forward this identification information to the voNSMF 171. The UE 101 may communicate with the voCN 159 using any communication protocol dependent on the technologies deployed in the RAN and voCN 159. Similarly, the voCN 159 can communicate with the voNSMF 171 using any suitable protocol or interface.

The voNSMF 171 or voCN 159 may determine in combination with the UE 101 connection request information, the parameters of a roaming slice that are to be established for the UE 101. The voNSMF 171 communicates 205 with the hoNSMF 121 to inform the hoNSMF 121 of the connection attempt by the UE 101 in the visited network 103. The voNSMF 171 can communicate with the hoNSMF 121 via any communication protocol or interface. The hoNSMF 121 receives the communication from the voNSMF 179 that contains identification information about the UE 101 and the type of service and the parameters of a network slice requested.

The hoNSMF 121 function requests 207 a UE 101 profile from the hoCN 109. The hoCN 109 returns 209 the requested UE 101 profile, which may include details of a service agreement between the homer operator and the user of the UE 101. The hoNSMF 121 then starts preparing a smart contract for the UE 101 using a smart contract template that is agreed upon between the home network operator and the visited network operator. The smart contract can include the details of the service agreement between the home network 105 and the user and similar information about the type of VNFs 113 and functions that the home network 105 provides to the UE 101.

The hoNSMF 121 selects a smart contract template 125 for the visited network 103 that has been agreed upon by the home network operator and the visited network operator. The template 125 selected can also be based on the roaming slice requirements as determined from the connection attempt message information provided by the voNSMF 171 and the UE 101 profile. The determination of the template 125 can also include determining which blockchain 181 or blockchain technology will be used. Each network operator may operate several blockchains using different blockchain technology. The hoNSMF 121 determines values for any parameters required to be initialized before starting a smart contract instance. For example, a whitelist of devices that are allowed to connect to the roaming slice and communicate with the smart contract instance in case the user of the UE 101 has multiple devices registered in the UE 101 profile or related profile. The hoNSMF 121 can generate an enrollment certificate, e.g., in a hyperledger embodiment, for the VNF 113 deployment, that would allow the VNF 113 to contact the smart contract and transact on the blockchain 181. Hyperledger is an opensource blockchain and set of related tools that support collaborative development of blockchain based distributed ledgers that are managed by the Hyperledger Project.

The smart contract created for the connecting UE 101 can further enable specifying the collection of usage data types over and above 3GPP specified media components. For example, as mentioned above, the smart contract may allow for producing usage data related to the CPU or similar resource usage of the VNFs 113 deployed in the SGi-LAN for the UE, the number of rules deployed in a Firewall VNF that was instantiated as part of the roaming slice 157 of the UE 101, the filtering activity of an Intrusion Detection System VNF that was instantiated as part of the roaming slice 157 of that customer, and similar usage data.

The hoNSMF 121 then installs 211 the smart contract for the connecting UE 101 into the blockchain 181. The blockchain 181 is managed through a distributed process and the process generates a response 213 to acknowledge a successful installation of the smart contract into the blockchain 181. The acknowledgment includes an address or similar identifier to locate the smart contract of the UE 101 in the blockchain 181. The hoNSMF 121 sends 215 the address or similar identifier of the smart contract in the blockchain 181 to the voNSMF 171.

The hoNSMF 121 then requests 217 traffic steering policies from the voNSMF 171. Traffic steering policies are settings and configurations for handling the forwarding of data traffic in a network, including prioritization, service chain processing and similar data traffic handling configuration. The voNSMF 171 replies 219 with traffic steering polices for the visited network 103. The hoNSMF 121 then combines the traffic steering policies to be installed in the SGi-LAN VNF(s) 163 from both the home network 105 and visited network 103, and determines the configuration for the VNF(s) 113, 163 for the UE 101.

The step of configuring the VNF instances 113 locally in the home network 105 simplifies the management and the migration of the context relevant to the SGi-LAN 111 services for the UE 101. This allows the new VNF instance 163 to interact faster locally with VNFM 171 and the element management system (EMS), even though tunnels towards these systems would need to be established for the runtime operations. As an alternative to the migration, in case the VNF 113 is developed using a stateless cloud-native paradigm, the state of the instance is saved locally in the home network 105, the microservice terminated and then the state is transferred to the home network 105 and a microservice re-instantiated there based on this state. The configuration of the VNFs 113 in the home network 105 also configures the VNFs 113 with the smart contract address to tie them to the smart contract. Once configuration of VNFs 113 for the UE 101 in the SGi-LAN 111 is complete, the VNFs 113 can be migrated 221 as images or similar data structures to the voNSMF 171, which then instantiates these VNFs 163 in the roaming slice 157 in the visited network 103.

As the visited network 103 has no capability to charge the user of the UE 101 specifically for each of the services to be deployed over the SGi-LAN interface 161, charging information needs to be collected and made available to the home network 105. This is accomplished by the charging proxy (ChP) component 175. A ChP 175 can be instantiated with the roaming slice 157 that is to execute the VNFs 163 for the UE 101. The role of the ChP 175 is to obtain usage information for both raw resources used by the VNF instances 163 as well as VNF-specific data generated from within the roaming slice 157. The ChP 175 then posts that information on the blockchain 181 such that it is associated or linked to the smart contract in the blockchain 181. For example, the ChP 175 can trigger an "Invoke" method of the smart contract. In one example implementation, the ChP 175 is a non-validating peer in a hyperledger implementation.

The voNSMF 171 receives the migrating VNFs 163 from the hoNSMF 121 and sends an acknowledgement 223 of a successful transfer. The voNSMF 171 then instantiates 225 the ChP 175 for the roaming slice 157 and migrated VNFs 163. In addition, once the ChP 175 is instantiated and the SGi-LAN VNFs 163 successfully instantiated in the visited network infrastructure, the hoNSFM 121 sends 226 a connection successful message to the voNSMF 171 and the voNSMF 171 informs 227 the voCN 159 of the success of the operation, and in turn the voCN 159 informs 229 the UE 101 of the success of the connection via standard 3GPP messages. The UE 101 can then begin to utilize 231 the resources of the visited network 103 in the same manner as it would operate in the home network 105.

Utilization of the visited network 103 is tracked by the ChP 175, which measures and records the resource utilization using standard metrics. The ChP 175 can then report the resource utilization periodically or in response to the utilization of various resources, by utilizing 233 methods or procedures of the smart contract for the UE 101 in the blockchain 181. The smart contract can define methods or procedures that can be utilized such as an "Invoke" method whereby the smart contract receives the resource utilization information as parameters or similar input to the method or procedure. The smart contract can then record this information in the blockchain 181, which can then be viewed by the home network operator to enable charges or accounting for the resource usage. In some embodiments, the smart contract may send notification of updates to the recorded information to the home network operator.

This process of monitoring and recording usage data to the smart contract and blockchain 181 can continue for the duration of the UE 101 resource utilization and connection to the visited network 103. This process can be terminated by the disconnect triggered by the UE 101, when the UE 101 asks the visited network 103 to terminate services associated with the UE 101. The UE 101 sends 235 a disconnect notification using standard 3GPP or similar messaging to the voCN 159. The voCN 159 notifies 237 the voNSMF 171 of the request for the UE 101 to disconnect. The disconnect requests can include the same or similar information to identify the UE 101, the home network 105, the smart contract, and similar related components. Similarly, the voNSMF 171 notifies 239 the hoNSMF 121 of the UE 101 disconnect request. The hoNSMF 121 can be identified using the UE 101 identification information or explicit identification of the hoNSMF 121 or home network 105 provided by the UE 101 identification information.

The hoNSMF 121 sends 241 a request for the voNSMF 171 to migrate the VNF instances 163 of the SGi-LAN 161 established for the UE 101 back to the home network 105 and can establish a network slice 107 for these VNFs 113 if the UE 101 has returned to the home network 105 or the VNF instances 113 can be stored to be migrated to another network or to be reinstantiated upon UE 101 return to the home network 105. The voNSMF 171 then migrates these VNFs 163 as images or similar data structures. The hoNSMF 121 upon completion of the migration sends a success acknowledgement 243 to the voNSMF 171.

The voNSMF 171 terminates 245 the ChP 175 and sends a disconnect acknowledgement 247 to the voCN 159 upon successful migration. The voCN 159 in turn relays the disconnect acknowledgement to the UE 101. The UE 101 is no longer connected to the visited network 103 at this stage. The hoNSMF 121 terminates the smart contract 251 in the blockchain 181. The termination of the smart contract can be by invoking a method or procedure of the smart contract or by addition of a related transaction completion to the blockchain 181 depending on the blockchain technology utilized. The blockchain 181 sends 253 an acknowledgement of the smart contract to the hoNSMF 121 indicating that the smart contract is no longer operable and the methods and procedures of the smart contract can no longer be invoked.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Figure 3:
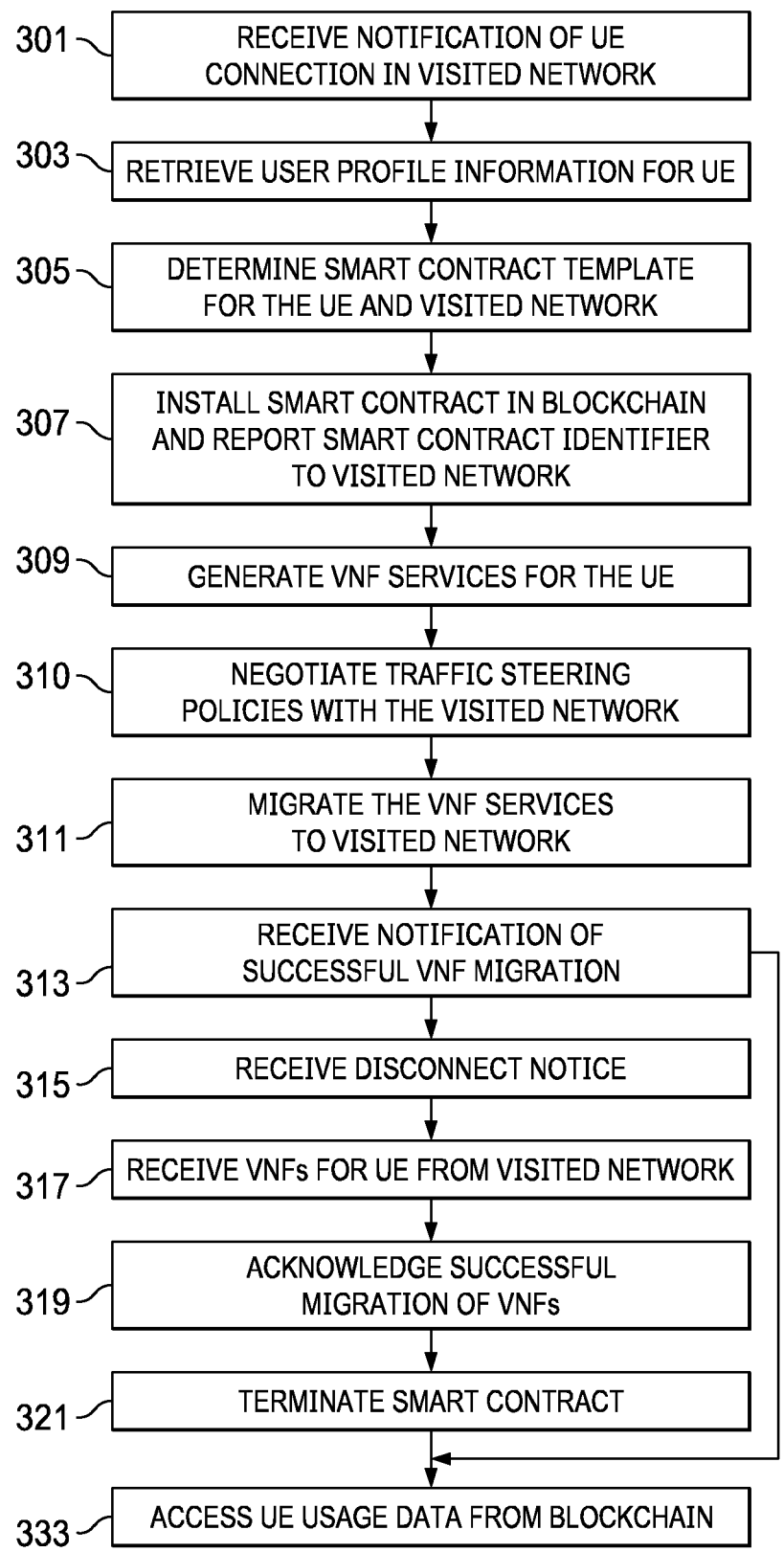
FIG. 3 is a flowchart of one embodiment of the operation of a Network Slicing Management Function (NSMF) in the home network to support smart contract management for UEs in visited networks.

FIG. 3 is a flowchart of one embodiment of the operation of the NSMF in the home network 105 to support smart contract management for UEs 101 in visited networks 103. The process is initiated by the home network NSMF 121 receiving a notification of a UE 101 connection request from a visited network 103 (Block 301). The notification can have any format or contain any UE 101 identification information. The notification may come from a NSMF 171 of the visited network 103. The UE 101 identification information may be a MAC address or similar identifier.

The UE 101 identification information is utilized to lookup user profile information associated with the UE 101 (Block 303). The user profile includes UE 101 device information and services associated with the user. The user profile information can include details of the service agreement between the home network operator and the user of the user device.

A smart contract template is selected from a set of available smart contract templates 125 (Block 305). A 'set,' as used herein refers to any positive whole number of items including one item. The selected smart contract template 125 is specific to an agreement between the home network operator and the visited network operator. Where the home network operator and the visited network operator have agreed to use more than one smart contract template 125, then the hoNSMF 121 can select based on the specifics of the user information from the user profile or based on home network operator preferences. Some smart contract templates 125 are specific to blockchain 181 technologies. The smart contract template 125 is then populated or similarly modified to include the details of the service agreement between the home network 105 and the user and similar information about the type of VNFs 113 and functions that the home network 105 provides to the UE 101. The smart contract created for the connecting UE 101 can further information specifying the type of data collection to be performed and reported.

The populated smart contract template 125 can then be installed into the associated blockchain 181 (Block 307). The installation of the smart contract can vary depending on the blockchain technology. For example, where a hyperledger is utilized, the hoNSMF 121 can generate an enrollment certificate. The blockchain 181 reports a successful installation of the smart contract into the blockchain 181. The report includes an identifier for the smart contract such as an address or similar location information to locate the installed smart contract of the UE 101 in the blockchain 181. In one embodiment, the report includes an address accessible over the smart contract application programming interface (API) of the blockchain 181. The hoNSMF 121 sends the address or locator for the smart contract in the blockchain 181 to the visited network 103 (e.g., to the voNSMF 171).

The hoNSMF 121 then negotiates traffic steering policies to apply to the UE 101 with the visited network 103 (e.g., with the voNSMF 171) (Block 310). The hoNSMF 121 may combine the traffic steering policies of the two networks in any combination that is agreed upon to be installed in the SGi-LAN VNF(s) 113 from both the home network 105 and visited network 103, and determines the configuration for the VNF(s) 163 for the UE 101 that will implement these traffic steering policies.

VNF instances 113 are created in the home network 105 and configured for the UE 101 based on the user profile and the combined traffic steering policies. The configuration of the VNFs 113 in the home network 105 also configures the VNFs 113 with the smart contract address to tie them to the smart contract. Once configuration of VNFs 113 for the UE 101 in the SGi-LAN is complete, the VNFs 113 can be prepared for migration. The VNFs 113 once configured can be converted into images or similar data structures that capture a current state of the VNFs 113 and that can be executed in a network or roaming slice 157. These VNF 113 images or similar data structures are then migrated to the visited network 103 using any communication protocol and any intermediate networks 191 to transfer the data (Block 311). The visited network 103 would then instantiate these VNFs 163 in the roaming slice 157 in the visited network 103 and send an acknowledgement of the successful migration to the hoNSMF 121 (Block 313).

The visited network 103 establishes a charge proxy 175 that report resource usage of the UE 101 to the blockchain 181 via the smart contract. The hoNSMF 121 can access the UE 101 usage statistics at any time from the blockchain 181 while the UE 101 is operating in the visited network 103 (Block 333). The charging proxy 175 of the visited network 103 will continuously or periodically update the usage information in the blockchain 181 until a request for disconnection is received from the UE 101.

The UE 101 disconnect notice is sent to the hoNSMF 121 from the visited network 103 (Block 315). In response to receiving the disconnect notice, the hoNSMF 121 prepares to receive the images or similar representations of the VNFs 163 that are servicing the UE 101 from the visited network 103 (Block 317). The hoNSMF 121 upon completion of the migration sends a success acknowledgement to the visited network (Block 319). A successful migration can include the receipt and storage or reinstantiation of each of the VNFs 163 for the UE 101. The hoNSMF 121 terminates the smart contract in the blockchain 181 (Block 321). The termination of the smart contract can be by invoking a method or procedure of the smart contract or by addition of a related transaction completion to the blockchain 181 depending on the blockchain technology utilized. The blockchain 181 may provide an acknowledgement of the smart contract termination to the hoNSMF 121 indicating that the smart contract is no longer operable and the methods and procedures of the smart contract can no longer be invoked. However, the usage information and the information in the smart contract can remain accessible in the blockchain 181 (Block 333). This information can be utilized to settle any accounting between the visited 103 and home network 105 operators as well as with the user of the UE 101 based on the agreements between these entities.

Figure 4:
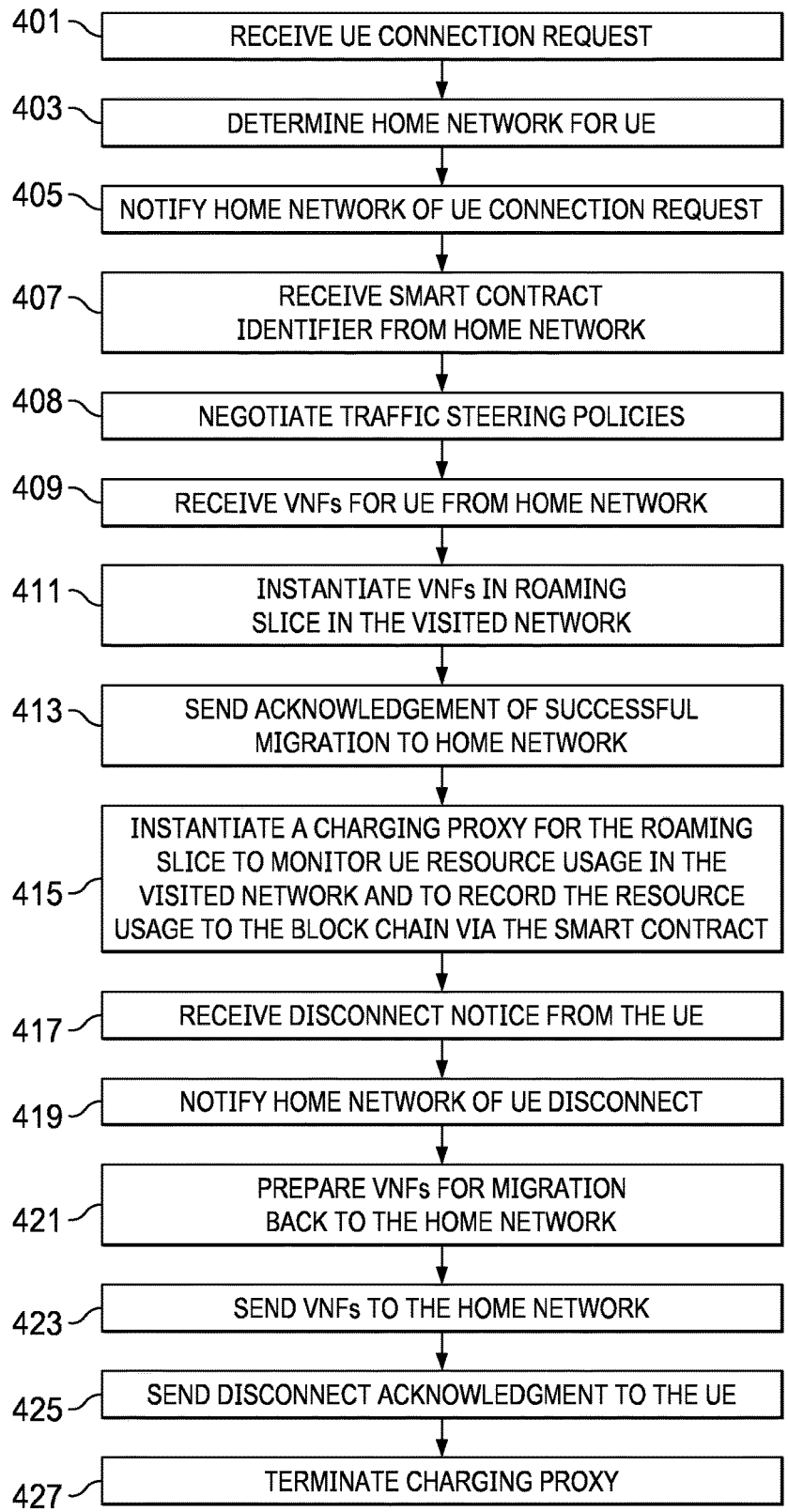
FIG. 4 is a flowchart of one embodiment of a process of a NSMF in a visited network to service a UE upon connection using smart contracts.

FIG. 4 is a flowchart of one embodiment of a process of a NSMF in a visited network 103 to service a UE 101 upon connection using smart contracts. The process is initiated by receiving the UE 101 connection request (Block 401). The UE 101 sends a connection message using a standard 3GPP interface. The UE 101 connection request can identify the UE 101 via a MAC address and may include identification information for the home network 105 of the UE 101. In some embodiments, the UE 101 provides information to identify a home network 105, user, smart contract identification or similar information to facilitate the connection of the UE 10 in the visited network 103. Using the information provided in the UE 101 connection request, the voNSMF 171 determines the home network 105 for the UE 101 (Block 403). The voNSMF 171 can consult a local data base or similarly look up home network information. Once the home network 103 is determined, a notification of the UE 101 connection request is sent to the home network 105 (Block 405). The notification may be sent to the hoNSMF 121.

The home network 105 (e.g., the hoNSMF 121) sends an address or similar identifier of the smart contract that the home network 105 has installed in the blockchain 181 to the voNSMF 171 (Block 407). The home network 105 also negotiates traffic steering policies to apply to the UE 101 (Block 408). The home network 105 may request traffic steering policies from the voNSMF 171. The voNSMF 171 can reply with traffic steering polices for the visited network 103. The home network 105 may then combine the traffic steering policies to be installed in the SGi-LAN VNF(s) 113 from both the home network 105 and visited network 103.

The home network 105 configures VNF instances 113 and begins the migration of the VNFs 113 and context relevant to the SGi-LAN services for the UE 101 (Block 409). The VNFs 113 can be migrated as images or similar data structures to the voNSMF 171, which then instantiates these VNFs 163 in a roaming slice 157 in the visited network 103 (Block 411). The roaming slice 157 can be established and prepared by the voNSMF 171 or other components of the visited network 103 to execute the VNFs 163 that are to service the connecting UE 101. Once all of the VNFs 163 for the UE 101 have been transferred and instantiated in the roaming slice 157, then the voNSMF 171 can send an acknowledgement to the home network 105 to indicate a successful migration (Block 413).

A ChP 175 is then instantiated with the roaming slice 157 that is to execute the VNFs 163 for the UE 101 (Block 415). The ChP 175 begins to track usage information for both raw resources used by the VNF instances 163 as well as VNF-specific data generated from within the roaming slice 157. The ChP 175 then posts that information on the blockchain 181 such that it is associated or linked to the smart contract in the blockchain 181.

The process of servicing the UE 101 in the visited network 103 can continue until the UE 101 seeks to disconnect from the visited network 103. The UE 101 asks the visited network 103 to terminate services associated with the UE 101 which is relayed to the voNSMF 171 (Block 417). The UE 101 sends a disconnect notification using standard 3GPP or similar messaging to the voNSMF 171. The voNSMF 171 notifies the home network 105 (e.g., the hoNSMF 121) of the UE 101 requesting the disconnect. The home network 105 can be identified using the UE 101 identification information or explicit identification of the hoNSMF 121 or home network 105 provided by the UE 101 identification information.

The voNSMF 171 begins to prepare to migrate the VNF instances 163 of the SGi-LAN 161 established for the UE 101 back to the home network 105 (Block 421). The execution of the VNFs 163 can be halted and they can be converted to images or similar data structures that can be sent to the home network 105. When ready the migration sends each of the VNFs 163 to the home network 105 (Block 423). The home network 105 may acknowledge a successful transfer of the VNFs 163 at which point the voNSMF 171 can send a disconnect acknowledgment to the UE 101 (Block 425). The voNSMF 171 terminates the ChP 175 (Block 427). The UE 101 is no longer connected to the visited network 103 at this stage.

Figure 5:
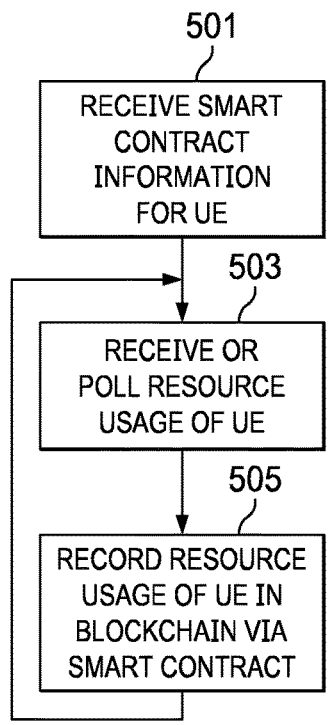
FIG. 5 is a diagram of one embodiment of the operation of a charging proxy adapted to utilize smart contracts to report resource usage of a visiting UE.

FIG. 5 is a diagram of one embodiment of the operation of a charging proxy 175 adapted to utilize smart contracts to report resource usage of a visiting UE 101. The visited network 103 utilizes a charging proxy 175 to track data and resource usage of a visiting UE 101 specifically tracking the services to be deployed over the SGi-LAN interface 161. This charging information needs to be collected and made available to the home network 105. A ChP 175 can be instantiated with the roaming slice 157 that is to execute the VNFs 163 for the UE 101. When instantiated by the visited network 103, the smart contract identification information or address is provided to the ChP 175 (Block 501). The ChP 175 obtains usage information for both raw resources used by the VNF instances 163 as well as VNF-specific data generated from within the roaming slice 157. The ChP 175 can collect this information by having the VNFs 163 or similar resources providing usage information or by polling these and similar entities to get the usage information (Block 503). The ChP 175 then posts that information on the blockchain 181 such that it is associated or linked to the smart contract in the blockchain 181 (Block 505). The recording of the information in the blockchain 181 is dependent on the blockchain technology. The ChP 175 can trigger a method of the smart contract in some embodiments to record data into the blockchain 181. The recording of data can be continuous or periodic at any interval or any level of granularity. The data usage recording can endure as long as the UE 101 is connected to the visited network 103. The visited network 103 will terminate the ChP 175 when the UE 101 disconnects.

Figure 6A:
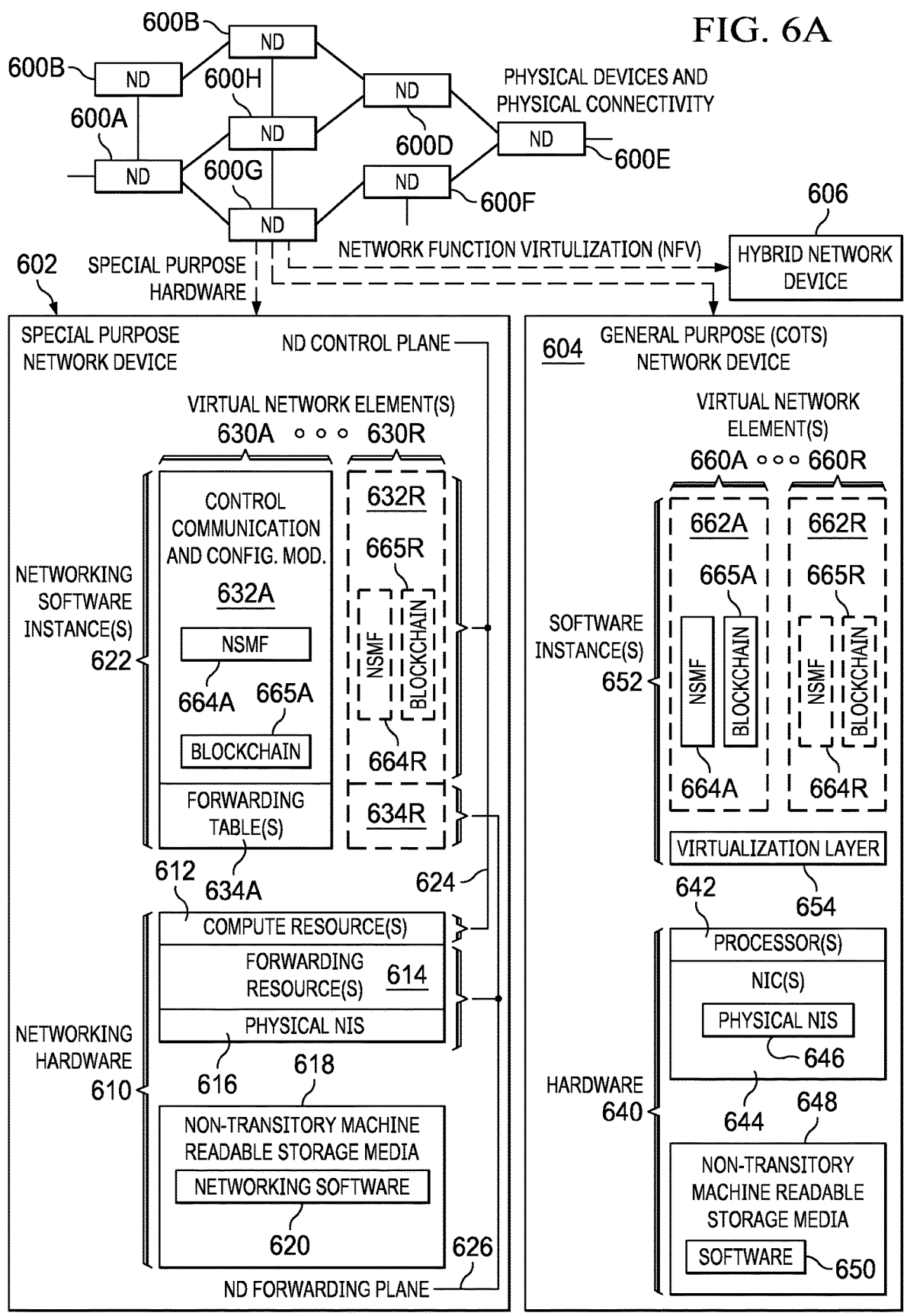
FIG. 6A illustrates connectivity between network devices (NDs) within an exemplary network, as well as three exemplary implementations of the NDs, according to some embodiments of the invention.

FIG. 6A illustrates connectivity between network devices (NDs) within an exemplary network, as well as three exemplary implementations of the NDs, according to some embodiments of the invention. FIG. 6A shows NDs 600A-H, and their connectivity by way of lines between 600A-600B, 600B-600C, 600C-600D, 600D-600E, 600E-600F, 600F-600G, and 600A-600G, as well as between 600H and each of 600A, 600C, 600D, and 600G. These NDs are physical devices, and the connectivity between these NDs can be wireless or wired (often referred to as a link). An additional line extending from NDs 600A, 600E, and 600F illustrates that these NDs act as ingress and egress points for the network (and thus, these NDs are sometimes referred to as edge NDs; while the other NDs may be called core NDs).

Two of the exemplary ND implementations in FIG. 6A are: 1) a special-purpose network device 602 that uses custom application-specific integrated-circuits (ASICs) and a special-purpose operating system (OS); and 2) a general-purpose network device 604 that uses common off-the-shelf (COTS) processors and a standard OS.

The special-purpose network device 602 includes networking hardware 610 comprising a set of one or more processor(s) 612, forwarding resource(s) 614 (which typically include one or more ASICs and/or network processors), and physical network interfaces (NIs) 616 (through which network connections are made, such as those shown by the connectivity between NDs 600A-H), as well as non-transitory machine-readable storage media 618 having stored therein networking software 620. During operation, the networking software 620 may be executed by the networking hardware 610 to instantiate a set of one or more networking software instance(s) 622. Each of the networking software instance(s) 622, and that part of the networking hardware 610 that executes that network software instance (be it hardware dedicated to that networking software instance and/or time slices of hardware temporally shared by that networking software instance with others of the networking software instance(s) 622), form a separate virtual network element 630A-R. Each of the virtual network element(s) (VNEs) 630A-R includes a control communication and configuration module 632A-R (sometimes referred to as a local control module or control communication module) and forwarding table(s) 634A-R, such that a given virtual network element (e.g., 630A) includes the control communication and configuration module (e.g., 632A), a set of one or more forwarding table(s) (e.g., 634A), and that portion of the networking hardware 610 that executes the virtual network element (e.g., 630A).

The special-purpose network device 602 is often physically and/or logically considered to include: 1) a ND control plane 624 (sometimes referred to as a control plane) comprising the processor(s) 612 that execute the control communication and configuration module(s) 632A-R; and 2) a ND forwarding plane 626 (sometimes referred to as a forwarding plane, a data plane, or a media plane) comprising the forwarding resource(s) 614 that utilize the forwarding table(s) 634A-R and the physical NIs 616. By way of example, where the ND is a router (or is implementing routing functionality), the ND control plane 624 (the processor(s) 612 executing the control communication and configuration module(s) 632A-R) is typically responsible for participating in controlling how data (e.g., packets) is to be routed (e.g., the next hop for the data and the outgoing physical NI for that data) and storing that routing information in the forwarding table(s) 634A-R, and the ND forwarding plane 626 is responsible for receiving that data on the physical NIs 616 and forwarding that data out the appropriate ones of the physical NIs 616 based on the forwarding table(s) 634A-R.

Figure 6B:
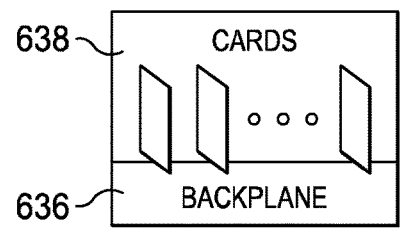
FIG. 6B illustrates an exemplary way to implement a special-purpose network device according to some embodiments of the invention.

FIG. 6B illustrates an exemplary way to implement the special-purpose network device 602 according to some embodiments of the invention. FIG. 6B shows a special-purpose network device including cards 638 (typically hot pluggable). While in some embodiments the cards 638 are of two types (one or more that operate as the ND forwarding plane 626 (sometimes called line cards), and one or more that operate to implement the ND control plane 624 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/ Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 636 (e.g., a first full mesh coupling the line cards and a second full mesh coupling all of the cards).

Returning to FIG. 6A, the general-purpose network device 604 includes hardware 640 comprising a set of one or more processor(s) 642 (which are often COTS processors) and physical NIs 646, as well as non-transitory machine-readable storage media 648 having stored therein software 650. During operation, the processor(s) 642 execute the software 650 to instantiate one or more sets of one or more applications 664A-R. While one embodiment does not implement virtualization, alternative embodiments may use different forms of virtualization. For example, in one such alternative embodiment the virtualization layer 654 represents the kernel of an operating system (or a shim executing on a base operating system) that allows for the creation of multiple instances 662A-R called software containers that may each be used to execute one (or more) of the sets of applications 664A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 654 represents a hypervisor (sometimes referred to as a virtual machine monitor (VMM)) or a hypervisor executing on top of a host operating system, and each of the sets of applications 664A-R is run on top of a guest operating system within an instance 662A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 640, directly on a hypervisor (in which case the unikernel is sometimes described as running within a LibOS virtual machine), or in a software container, embodiments can be implemented fully with unikernels running directly on a hypervisor represented by virtualization layer 654, unikernels running within software containers represented by instances 662A-R, or as a combination of unikernels and the above-described techniques (e.g., unikernels and virtual machines both run directly on a hypervisor, unikernels and sets of applications that are run in different software containers).

The instantiation of the one or more sets of one or more applications 664A-R, as well as virtualization if implemented, are collectively referred to as software instance(s) 652. Each set of applications 664A-R, corresponding virtualization construct (e.g., instance 662A-R) if implemented, and that part of the hardware 640 that executes them (be it hardware dedicated to that execution and/or time slices of hardware temporally shared), forms a separate virtual network element(s) 660A-R. In the embodiments, the applications 664A-R can include NSMF as described herein above that can function as the home or visited NSMF. In further embodiments, the applications can include blockchain supporting or implementing software 665A-R. Other components described herein can similarly be implemented as applications including VNFs, ChPs and similar elements (not illustrated).

The virtual network element(s) 660A-R perform similar functionality to the virtual network element(s) 630A-R—e.g., similar to the control communication and configuration module(s) 632A and forwarding table(s) 634A (this virtualization of the hardware 640 is sometimes referred to as network function virtualization (NFV)). Thus, NFV may be used to consolidate many network equipment types onto industry standard high-volume server hardware, physical switches, and physical storage, which could be located in Data centers, NDs, and customer premise equipment (CPE). While embodiments of the invention are illustrated with each instance 662A-R corresponding to one VNE 660A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 662A-R to VNEs also apply to embodiments where such a finer level of granularity and/or unikernels are used.

In certain embodiments, the virtualization layer 654 includes a virtual switch that provides similar forwarding services as a physical Ethernet switch. Specifically, this virtual switch forwards traffic between instances 662A-R and the physical NI(s) 646, as well as optionally between the instances 662A-R; in addition, this virtual switch may enforce network isolation between the VNEs 660A-R that by policy are not permitted to communicate with each other (e.g., by honoring virtual local area networks (VLANs)).

The third exemplary ND implementation in FIG. 6A is a hybrid network device 606, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 602) could provide for para-virtualization to the networking hardware present in the hybrid network device 606.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 630A-R, VNEs 660A-R, and those in the hybrid network device 606) receives data on the physical NIs (e.g., 616, 646) and forwards that data out the appropriate ones of the physical NIs (e.g., 616, 646). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 6C:
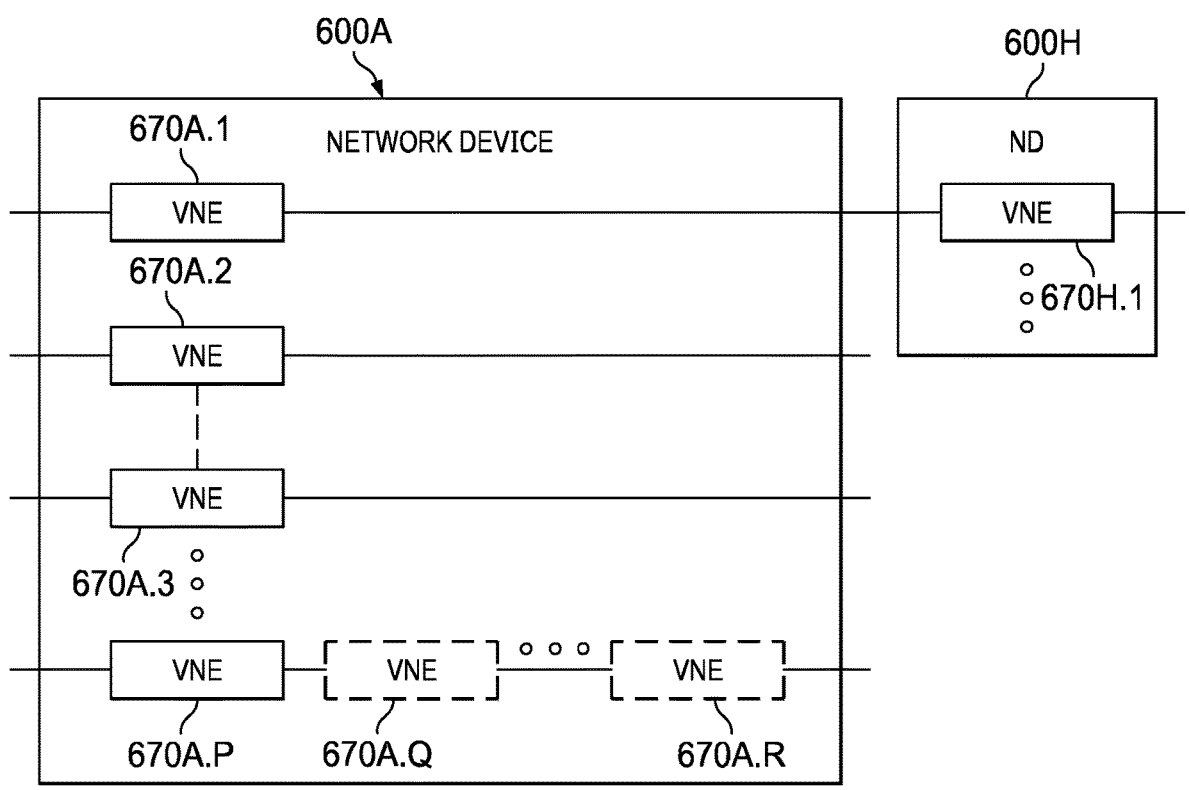
FIG. 6C illustrates various exemplary ways in which virtual network elements (VNEs) may be coupled according to some embodiments of the invention.

FIG. 6C illustrates various exemplary ways in which VNEs may be coupled according to some embodiments of the invention. FIG. 6C shows VNEs 670A.1-670A.P (and optionally VNEs 670A.Q-670A.R) implemented in ND 600A and VNE 670H.1 in ND 600H. In FIG. 6C, VNEs 670A.1-P are separate from each other in the sense that they can receive packets from outside ND 600A and forward packets outside of ND 600A; VNE 670A.1 is coupled with VNE 670H.1, and thus they communicate packets between their respective NDs; VNE 670A.2-670A.3 may optionally forward packets between themselves without forwarding them outside of the ND 600A; and VNE 670A.P may optionally be the first in a chain of VNEs that includes VNE 670A.Q followed by VNE 670A.R (this is sometimes referred to as dynamic service chaining, where each of the VNEs in the series of VNEs provides a different service— e.g., one or more layer 4-7 network services). While FIG. 6C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 6A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 6A may also host one or more such servers (e.g., in the case of the general purpose network device 604, one or more of the software instances 662A-R may operate as servers; the same would be true for the hybrid network device 606; in the case of the special-purpose network device 602, one or more such servers could also be run on a virtualization layer executed by the processor(s) 612); in which case the servers are said to be co-located with the VNEs of that ND.

A virtual network is a logical abstraction of a physical network (such as that in FIG. 6A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 6D:
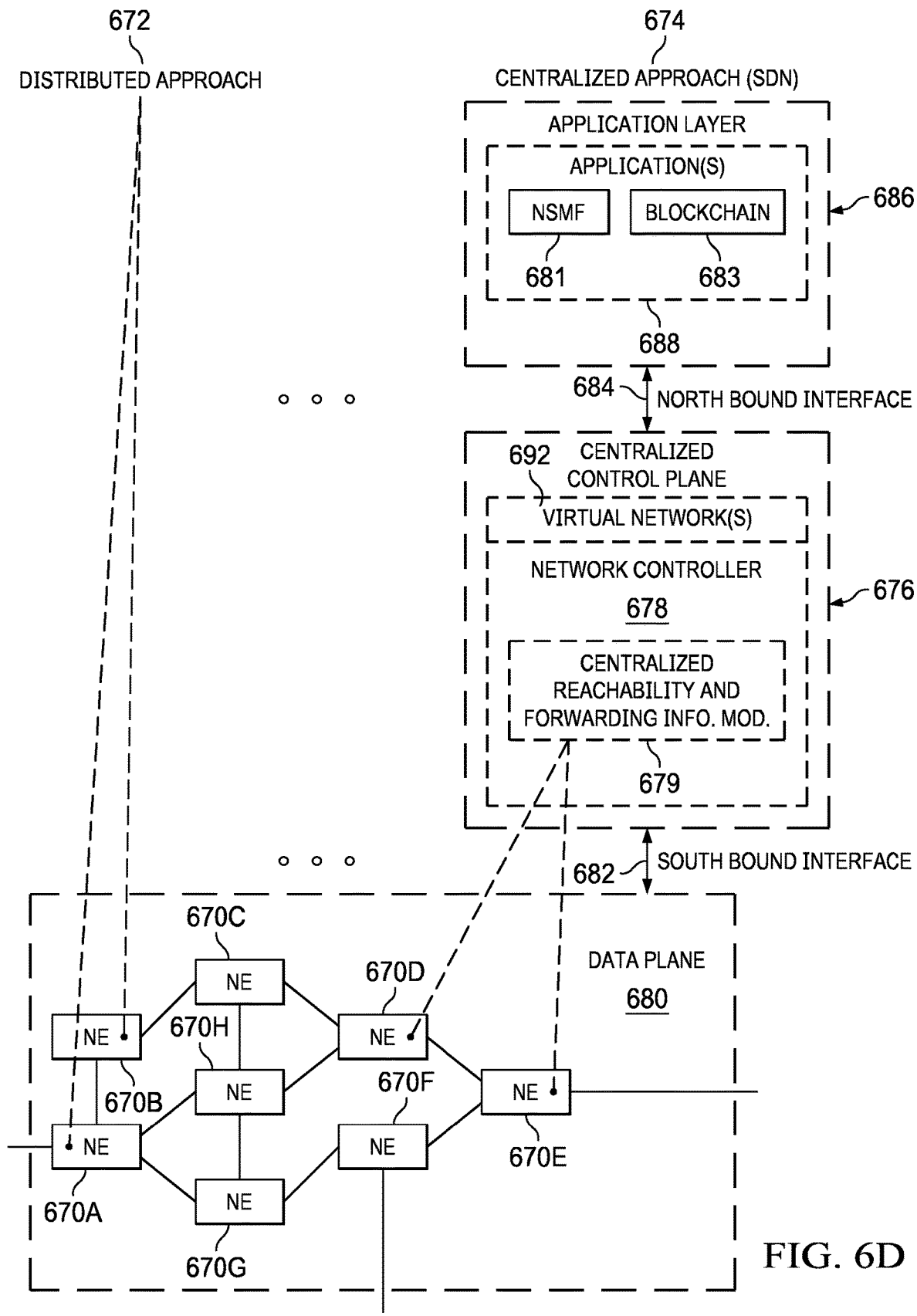
FIG. 6D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 6D illustrates a network with a single network element on each of the NDs of FIG. 6A, and within this straight forward approach contrasts a traditional distributed approach (commonly used by traditional routers) with a centralized approach for maintaining reachability and forwarding information (also called network control), according to some embodiments of the invention. Specifically, FIG. 6D illustrates network elements (NEs) 670A-H with the same connectivity as the NDs 600A-H of FIG. 6A.

FIG. 6D illustrates that the distributed approach 672 distributes responsibility for generating the reachability and forwarding information across the NEs 670A-H; in other words, the process of neighbor discovery and topology discovery is distributed.

For example, where the special-purpose network device 602 is used, the control communication and configuration module(s) 632A-R of the ND control plane 624 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 670A-H (e.g., the processor(s) 612 executing the control communication and configuration module(s) 632A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 624. The ND control plane 624 programs the ND forwarding plane 626 with information (e.g., adjacency and route information) based on the routing structure(s). For example, the ND control plane 624 programs the adjacency and route information into one or more forwarding table(s) 634A-R (e.g., Forwarding Information Base (FIB), Label Forwarding Information Base (LFIB), and one or more adjacency structures) on the ND forwarding plane 626. For layer 2 forwarding, the ND can store one or more bridging tables that are used to forward data based on the layer 2 information in that data. While the above example uses the special-purpose network device 602, the same distributed approach 672 can be implemented on the general-purpose network device 604 and the hybrid network device 606.

FIG. 6D illustrates that a centralized approach 674 (also known as software defined networking (SDN)) that decouples the system that makes decisions about where traffic is sent from the underlying systems that forwards traffic to the selected destination. The illustrated centralized approach 674 has the responsibility for the generation of reachability and forwarding information in a centralized control plane 676 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 676 has a south bound interface 682 with a data plane 680 (sometime referred to the infrastructure layer, network forwarding plane, or forwarding plane (which should not be confused with a ND forwarding plane)) that includes the NEs 670A-H (sometimes referred to as switches, forwarding elements, data plane elements, or nodes). The centralized control plane 676 includes a network controller 678, which includes a centralized reachability and forwarding information module 679 that determines the reachability within the network and distributes the forwarding information to the NEs 670A-H of the data plane 680 over the south bound interface 682 (which may use the OpenFlow protocol). Thus, the network intelligence is centralized in the centralized control plane 676 executing on electronic devices that are typically separate from the NDs.

For example, where the special-purpose network device 602 is used in the data plane 680, each of the control communication and configuration module(s) 632A-R of the ND control plane 624 typically include a control agent that provides the VNE side of the south bound interface 682. In this case, the ND control plane 624 (the processor(s) 612 executing the control communication and configuration module(s) 632A-R) performs its responsibility for participating in controlling how data (e.g., packets) is to be routed (e.g., the next hop for the data and the outgoing physical NI for that data) through the control agent communicating with the centralized control plane 676 to receive the forwarding information (and in some cases, the reachability information) from the centralized reachability and forwarding information module 679 (it should be understood that in some embodiments of the invention, the control communication and configuration module(s) 632A-R, in addition to communicating with the centralized control plane 676, may also play some role in determining reachability and/or calculating forwarding information—albeit less so than in the case of a distributed approach; such embodiments are generally considered to fall under the centralized approach 674, but may also be considered a hybrid approach).

While the above example uses the special-purpose network device 602, the same centralized approach 674 can be implemented with the general purpose network device 604 (e.g., each of the VNE 660A-R performs its responsibility for controlling how data (e.g., packets) is to be routed (e.g., the next hop for the data and the outgoing physical NI for that data) by communicating with the centralized control plane 676 to receive the forwarding information (and in some cases, the reachability information) from the centralized reachability and forwarding information module 679; it should be understood that in some embodiments of the invention, the VNEs 660A-R, in addition to communicating with the centralized control plane 676, may also play some role in determining reachability and/or calculating forwarding information—albeit less so than in the case of a distributed approach) and the hybrid network device 606. In fact, the use of SDN techniques can enhance the NFV techniques typically used in the general-purpose network device 604 or hybrid network device 606 implementations as NFV is able to support SDN by providing an infrastructure upon which the SDN software can be run, and NFV and SDN both aim to make use of commodity server hardware and physical switches.

FIG. 6D also shows that the centralized control plane 676 has a north bound interface 684 to an application layer 686, in which resides application(s) 688. The centralized control plane 676 has the ability to form virtual networks 692 (sometimes referred to as a logical forwarding plane, network services, or overlay networks (with the NEs 670A-H of the data plane 680 being the underlay network)) for the application(s) 688. Thus, the centralized control plane 676 maintains a global view of all NDs and configured NEs/VNEs, and it maps the virtual networks to the underlying NDs efficiently (including maintaining these mappings as the physical network changes either through hardware (ND, link, or ND component) failure, addition, or removal). In the embodiments, the applications 688 can include NSMF 681 as described herein above that can function as the home or visited NSMF. In further embodiments, the applications can include blockchain supporting or implementing software 683. Other components described herein can similarly be implemented as applications including VNFs, ChPs and similar elements (not illustrated).

While FIG. 6D shows the distributed approach 672 separate from the centralized approach 674, the effort of network control may be distributed differently or the two combined in certain embodiments of the invention. For example: 1) embodiments may generally use the centralized approach (SDN) 674, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 674, but may also be considered a hybrid approach.

While FIG. 6D illustrates the simple case where each of the NDs 600A-H implements a single NE 670A-H, it should be understood that the network control approaches described with reference to FIG. 6D also work for networks where one or more of the NDs 600A-H implement multiple VNEs (e.g., VNEs 630A-R, VNEs 660A-R, those in the hybrid network device 606). Alternatively, or in addition, the network controller 678 may also emulate the implementation of multiple VNEs in a single ND. Specifically, instead of (or in addition to) implementing multiple VNEs in a single ND, the network controller 678 may present the implementation of a VNE/NE in a single ND as multiple VNEs in the virtual networks 692 (all in the same one of the virtual network(s) 692, each in different ones of the virtual network(s) 692, or some combination). For example, the network controller 678 may cause an ND to implement a single VNE (a NE) in the underlay network, and then logically divide up the resources of that NE within the centralized control plane 676 to present different VNEs in the virtual network(s) 692 (where these different VNEs in the overlay networks are sharing the resources of the single VNE/NE implementation on the ND in the underlay network).

Figure 6E:
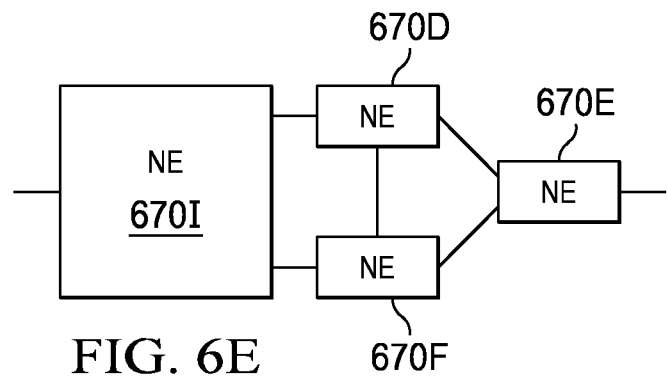
FIG. 6E illustrates the simple case of where each of the NDs implements a single NE, but a centralized control plane has abstracted multiple of the NEs in different NDs into (to represent) a single NE in one of the virtual network(s), according to some embodiments of the invention.
Figure 6F:
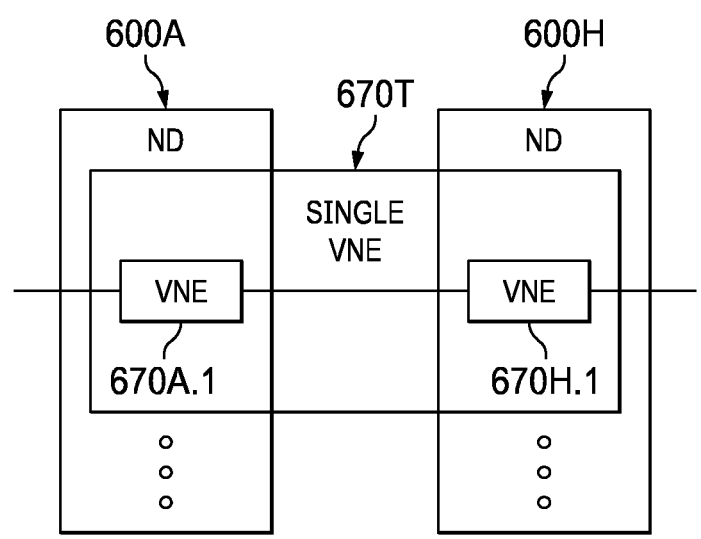
FIG. 6F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 6E and 6F respectively illustrate exemplary abstractions of NEs and VNEs that the network controller 678 may present as part of different ones of the virtual networks 692. FIG. 6E illustrates the simple case of where each of the NDs 600A-H implements a single NE 670A-H (see FIG. 6D), but the centralized control plane 676 has abstracted multiple of the NEs in different NDs (the NEs 670A-C and G-H) into (to represent) a single NE 6701 in one of the virtual network(s) 692 of FIG. 6D, according to some embodiments of the invention. FIG. 6E shows that in this virtual network, the NE 6701 is coupled to NE 670D and 670F, which are both still coupled to NE 670E.

FIG. 6F illustrates a case where multiple VNEs (VNE 670A.1 and VNE 670H.1) are implemented on different NDs (ND 600A and ND 600H) and are coupled to each other, and where the centralized control plane 676 has abstracted these multiple VNEs such that they appear as a single VNE 670T within one of the virtual networks 692 of FIG. 6D, according to some embodiments of the invention. Thus, the abstraction of a NE or VNE can span multiple NDs.

While some embodiments of the invention implement the centralized control plane 676 as a single entity (e.g., a single instance of software running on a single electronic device), alternative embodiments may spread the functionality across multiple entities for redundancy and/or scalability purposes (e.g., multiple instances of software running on different electronic devices).

Figure 7:
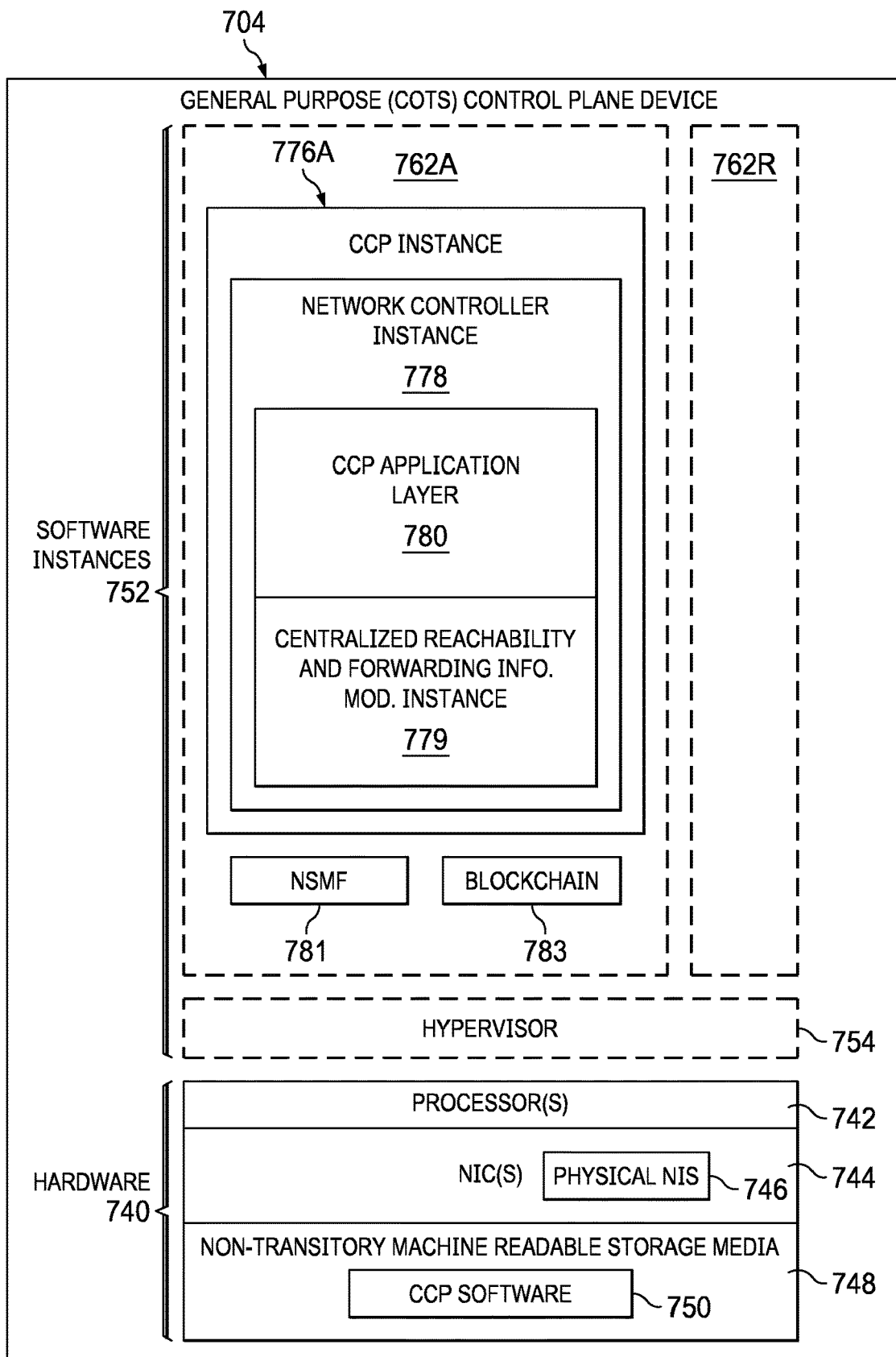
FIG. 7 illustrates a general-purpose control plane device with centralized control plane (CCP) software, according to some embodiments of the invention.

Similar to the network device implementations, the electronic device(s) running the centralized control plane 676, and thus the network controller 678 including the centralized reachability and forwarding information module 679, may be implemented a variety of ways (e.g., a special purpose device, a general-purpose (e.g., COTS) device, or hybrid device). These electronic device(s) would similarly include processor(s), a set or one or more physical NIs, and a non-transitory machine-readable storage medium having stored thereon the centralized control plane software. For instance, FIG. 7 illustrates, a general-purpose control plane device 704 including hardware 740 comprising a set of one or more processor(s) 742 (which are often COTS processors) and physical NIs 746, as well as non-transitory machine-readable storage media 748 having stored therein centralized control plane (CCP) software 750.

In embodiments that use compute virtualization, the processor(s) 742 typically execute software to instantiate a virtualization layer 754 (e.g., in one embodiment the virtualization layer 754 represents the kernel of an operating system (or a shim executing on a base operating system) that allows for the creation of multiple instances 762A-R called software containers (representing separate user spaces and also called virtualization engines, virtual private servers, or jails) that may each be used to execute a set of one or more applications; in another embodiment the virtualization layer 754 represents a hypervisor (sometimes referred to as a virtual machine monitor (VMM)) or a hypervisor executing on top of a host operating system, and an application is run on top of a guest operating system within an instance 762A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 740, directly on a hypervisor represented by virtualization layer 754 (in which case the unikernel is sometimes described as running within a LibOS virtual machine), or in a software container represented by one of instances 762A-R). Again, in embodiments where compute virtualization is used, during operation an instance of the CCP software 750 (illustrated as CCP instance 776A) is executed (e.g., within the instance 762A) on the virtualization layer 754. In embodiments where compute virtualization is not used, the CCP instance 776A is executed, as a unikernel or on top of a host operating system, on the "bare metal" general purpose control plane device 704. The instantiation of the CCP instance 776A, as well as the virtualization layer 754 and instances 762A-R if implemented, are collectively referred to as software instance(s) 752.

In the embodiments, the software containers 762A-R can include NSMF 781 as described herein above that can function as the home or visited NSMF. In further embodiments, the software containers can include blockchain supporting or implementing software 783. Other components described herein can similarly be implemented as applications including VNFs, ChPs and similar elements (not illustrated).

In some embodiments, the CCP instance 776A includes a network controller instance 778. The network controller instance 778 includes a centralized reachability and forwarding information module instance 779 (which is a middleware layer providing the context of the network controller 678 to the operating system and communicating with the various NEs), and an CCP application layer 780 (sometimes referred to as an application layer) over the middleware layer (providing the intelligence required for various network operations such as protocols, network situational awareness, and user-interfaces). At a more abstract level, this CCP application layer 780 within the centralized control plane 676 works with virtual network view(s) (logical view(s) of the network) and the middleware layer provides the conversion from the virtual networks to the physical view.

The centralized control plane 676 transmits relevant messages to the data plane 680 based on CCP application layer 780 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 680 may receive different messages, and thus different forwarding information. The data plane 680 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 680, the packet (or a subset of the packet header and content) is typically forwarded to the centralized control plane 676. The centralized control plane 676 will then program forwarding table entries into the data plane 680 to accommodate packets belonging to the flow of the unknown packet. Once a specific forwarding table entry has been programmed into the data plane 680 by the centralized control plane 676, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Some NDs include functionality for authentication, authorization, and accounting (AAA) protocols (e.g., RADIUS (Remote Authentication Dial-In User Service), Diameter, and/or TACACS+ (Terminal Access Controller Access Control System Plus). AAA can be provided through a client/server model, where the AAA client is implemented on a ND and the AAA server can be implemented either locally on the ND or on a remote electronic device coupled with the ND. Authentication is the process of identifying and verifying a subscriber. For instance, a subscriber might be identified by a combination of a username and a password or through a unique key. Authorization determines what a subscriber can do after being authenticated, such as gaining access to certain electronic device information resources (e.g., through the use of access control policies). Accounting is recording user activity. By way of a summary example, end user devices may be coupled (e.g., through an access network) through an edge ND (supporting AAA processing) coupled to core NDs coupled to electronic devices implementing servers of service/content providers. AAA processing is performed to identify for a subscriber the subscriber record stored in the AAA server for that subscriber. A subscriber record includes a set of attributes (e.g., subscriber name, password, authentication information, access control information, rate-limiting information, policing information) used during processing of that subscriber's traffic.

Certain NDs (e.g., certain edge NDs) internally represent end user devices (or sometimes customer premise equipment (CPE) such as a residential gateway (e.g., a router, modem)) using subscriber circuits. A subscriber circuit uniquely identifies within the ND a subscriber session and typically exists for the lifetime of the session. Thus, a ND typically allocates a subscriber circuit when the subscriber connects to that ND, and correspondingly de-allocates that subscriber circuit when that subscriber disconnects. Each subscriber session represents a distinguishable flow of packets communicated between the ND and an end user device (or sometimes CPE such as a residential gateway or modem) using a protocol, such as the point-to-point protocol over another protocol (PPPoX) (e.g., where X is Ethernet or Asynchronous Transfer Mode (ATM)), Ethernet, 802.1Q Virtual LAN (VLAN), Internet Protocol, or ATM). A subscriber session can be initiated using a variety of mechanisms (e.g., manual provisioning a dynamic host configuration protocol (DHCP), DHCP/client-less internet protocol service (CLIPS) or Media Access Control (MAC) address tracking). For example, the point-to-point protocol (PPP) is commonly used for digital subscriber line (DSL) services and requires installation of a PPP client that enables the subscriber to enter a username and a password, which in turn may be used to select a subscriber record. When DHCP is used (e.g., for cable modem services), a username typically is not provided; but in such situations other information (e.g., information that includes the MAC address of the hardware in the end user device (or CPE)) is provided. The use of DHCP and CLIPS on the ND captures the MAC addresses and uses these addresses to distinguish subscribers and access their subscriber records.

A virtual circuit (VC), synonymous with virtual connection and virtual channel, is a connection oriented communication service that is delivered by means of packet mode communication. Virtual circuit communication resembles circuit switching, since both are connection oriented, meaning that in both cases data is delivered in correct order, and signaling overhead is required during a connection establishment phase. Virtual circuits may exist at different layers. For example, at layer 4, a connection oriented transport layer datalink protocol such as Transmission Control Protocol (TCP) may rely on a connectionless packet switching network layer protocol such as IP, where different packets may be routed over different paths, and thus be delivered out of order. Where a reliable virtual circuit is established with TCP on top of the underlying unreliable and connectionless IP protocol, the virtual circuit is identified by the source and destination network socket address pair, i.e. the sender and receiver IP address and port number. However, a virtual circuit is possible since TCP includes segment numbering and reordering on the receiver side to prevent out-of-order delivery. Virtual circuits are also possible at Layer 3 (network layer) and Layer 2 (datalink layer); such virtual circuit protocols are based on connection oriented packet switching, meaning that data is always delivered along the same network path, i.e. through the same NEs/VNEs. In such protocols, the packets are not routed individually and complete addressing information is not provided in the header of each data packet; only a small virtual channel identifier (VCI) is required in each packet; and routing information is transferred to the NEs/VNEs during the connection establishment phase; switching only involves looking up the virtual channel identifier in a table rather than analyzing a complete address. Examples of network layer and datalink layer virtual circuit protocols, where data always is delivered over the same path: X.25, where the VC is identified by a virtual channel identifier (VCI); Frame relay, where the VC is identified by a VCI; Asynchronous Transfer Mode (ATM), where the circuit is identified by a virtual path identifier (VPI) and virtual channel identifier (VCI) pair; General Packet Radio Service (GPRS); and Multiprotocol label switching (MPLS), which can be used for IP over virtual circuits (Each circuit is identified by a label).

Certain NDs (e.g., certain edge NDs) use a hierarchy of circuits. The leaf nodes of the hierarchy of circuits are subscriber circuits. The subscriber circuits have parent circuits in the hierarchy that typically represent aggregations of multiple subscriber circuits, and thus the network segments and elements used to provide access network connectivity of those end user devices to the ND. These parent circuits may represent physical or logical aggregations of subscriber circuits (e.g., a virtual local area network (VLAN), a permanent virtual circuit (PVC) (e.g., for Asynchronous Transfer Mode (ATM)), a circuit-group, a channel, a pseudo-wire, a physical NI of the ND, and a link aggregation group). A circuit-group is a virtual construct that allows various sets of circuits to be grouped together for configuration purposes, for example aggregate rate control. A pseudo-wire is an emulation of a layer 2 point-to-point connection-oriented service. A link aggregation group is a virtual construct that merges multiple physical NIs for purposes of bandwidth aggregation and redundancy. Thus, the parent circuits physically or logically encapsulate the subscriber circuits.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method of managing user equipment resource tracking in a visited network using blockchain based smart contracts, the method implemented by a device in a home network of the user equipment, the method comprising:

receiving notification from the visited network of the user equipment connection request;
installing a smart contract for the user equipment into a blockchain;
reporting an identifier for the smart contract to the visited network to enable recording of resource usage of the user equipment to the blockchain and association with the smart contract;
migrating virtual network functions (VNFs) with a current state of VNFs for the user equipment to the visited network;
retrieving a user profile information for the user equipment;
determining a smart contract template for the user equipment and the visited network;
generating virtual network functions to service the user equipment based on the user profile; and
negotiating traffic steering policies to apply to the user equipment with the visited network.

2. The method of claim 1, further comprising:
receiving a disconnect notice from the visited network for the user equipment; and
receiving virtual network functions for the user equipment from the visited network.

3. The method of claim 1, further comprising:
receiving notification of successful virtual network function migration;
acknowledging successful migration of virtual network functions;
terminating the smart contract; and
accessing user equipment usage data from the blockchain.

4. A non-transitory computer-readable medium having stored therein a set of instructions, which when executed by a computing device cause the computing device to execute a set of operations for a method of managing user equipment resource tracking in a visited network using blockchain based smart contracts, the method implemented by a device in a home network of the user equipment, the set of operations comprising:

receiving notification from the visited network of the user equipment connection request;
installing a smart contract for the user equipment into a blockchain;
reporting an identifier for the smart contract to the visited network to enable recording of resource usage of the user equipment to the blockchain and association with the smart contract;
migrating virtual network functions (VNFs) with a current state of VNFs for the user equipment to the visited network;
retrieving a user profile information for the user equipment;
determining a smart contract template for the user equipment and the visited network;
generating virtual network functions to service the user equipment based on the user profile; and
negotiating traffic steering policies to apply to the user equipment with the visited network.

5. The non-transitory computer readable medium of claim 4, wherein the operations comprise:
receiving a disconnect notice from the visited network for the user equipment; and
receiving virtual network functions for the user equipment from the visited network.

6. The non-transitory computer readable medium of claim 4, wherein the operations comprise:

receiving notification of successful virtual network function migration;
acknowledging successful migration of virtual network functions;
terminating the smart contract; and
accessing user equipment usage data from the blockchain.

7. A method of managing user equipment resource tracking in a visited network using blockchain based smart contracts, the method implemented by a device in a visited network, the method comprising:
receiving a connection request from the user equipment;
notifying a home network for the user equipment of the connection request;
instantiating a charging proxy in the visited network for the user equipment to track resource usage of the user equipment in the visited network using a smart contract and blockchain to report resource usage for the user equipment; migrating virtual network functions (VNFs) with a current state of VNFs for the user equipment to the visited network;
receiving a smart contract identifier of the smart contract of the user equipment in the blockchain from the home network; and
negotiating traffic steering policies to apply to the user equipment with the home network.

8. The method of claim 7, further comprising:
receiving virtual network functions (VNFs) for the user equipment from the home network;
generating VNFs to service the user equipment in a roaming slice in the visited network based the received VNFs; and
sending acknowledgment of successful migration to the home network.

9. The method of claim 7, further comprising:
invoking a method of the smart contract for the user equipment to create a block in the blockchain to store resource usage information for the user equipment.

10. The method of claim 7, further comprising:
receiving a disconnect notice from the user equipment;
notifying a home network of disconnect of the user equipment;
preparing virtual network functions for migration to the home network;
sending virtual network functions to the home network;
sending a disconnect acknowledgement to the user equipment; and
terminating the charging proxy.

11. A non-transitory computer-readable medium having stored therein a set of instructions, which when executed by a computing device cause the computing device to execute a set of operations for a method of managing user equipment resource tracking in a visited network using blockchain based smart contracts, the method implemented by a device in a home network of the user equipment, the set of operations comprising:
receiving a connection request from the user equipment;
notifying a home network for the user equipment of the connection request;
instantiating a charging proxy in the visited network for the user equipment to track resource usage of the user equipment in the visited network using a smart contract and blockchain to report resource usage for the user equipment;
migrating virtual network functions (VNFs) with a current state of VNFs for the user equipment to the visited network;
receiving a smart contract identifier of the smart contract of the user equipment in the blockchain from the home network; and
negotiating traffic steering policies to apply to the user equipment with the home network.

12. The non-transitory computer readable medium of claim 11, wherein the operations further comprise:
receiving virtual network functions (VNFs) for the user equipment from the home network;
generating VNFs to service the user equipment in a roaming slice in the visited network based the received VNFs; and
sending acknowledgment of successful migration to the home network.

13. The non-transitory computer readable medium of claim 11, wherein the operations comprise:
invoking a method of the smart contract for the user equipment to create a block in the blockchain to store resource usage information for the user equipment.

14. The non-transitory computer readable medium of claim 11, wherein the operations comprise:
receiving a disconnect notice from the user equipment;
notifying a home network of disconnect of the user equipment;
preparing virtual network functions for migration to the home network;
sending virtual network functions to the home network;
sending a disconnect acknowledgement to the user equipment; and
terminating the charging proxy.

* * * * *